United States Patent [19]
Baits

[11] 4,033,115
[45] July 5, 1977

[54] EMERGENCY HYDRAULIC POWER SYSTEM (START BOTTLE)

[75] Inventor: Stephen S. Baits, Rockford, Ill.

[73] Assignee: Sundstrand Corporation, Rockford, Ill.

[22] Filed: June 2, 1976

[21] Appl. No.: 692,083

[52] U.S. Cl. .................... 60/39.09 R; 60/39.28 R; 60/39.48; 60/39.14; 60/39.46 M; 60/223; 60/250

[51] Int. Cl.² .................... F02C 7/26; F02G 3/00

[58] Field of Search ........ 60/39.09 R, 39.14, 39.25, 60/39.28 R, 39.46 M, 37, 39.48, 223, 250

[56] References Cited

UNITED STATES PATENTS

| | | | |
|---|---|---|---|
| 3,660,977 | 5/1972 | Reynolds | 60/39.28 R |
| 3,722,217 | 3/1973 | Reynolds | 60/39.09 R |
| 3,800,534 | 4/1974 | Kacek | 60/39.28 R |

Primary Examiner—Clarence R. Gordon
Attorney, Agent, or Firm—Ted E. Killingsworth; Michael B. McMurray; William R. Peoples

[57] ABSTRACT

An emergency hydraulic power system for aircraft which becomes operable upon aircraft engine failure includes a hot gas turbine for driving a hydraulic pump, a decomposition chamber to provide hot gas for driving the turbine, a normally unpressurized fuel storage tank, and a fuel pump for delivering fuel from the tank to the decomposition chamber. A start system includes a start fuel bottle having a cell filled with fuel and provided with a movable wall, and a cylinder of gas under high pressure which is regulated to put intermediate pressure on the movable wall and expel fuel from the cell, and also to put low pressure on the fuel tank, after a start valve is opened. Both the fuel tank and the start fuel cell communicate with an inlet conduit which goes to the fuel pump inlet, and a valve is provided to prevent start fuel from going into the fuel tank; and there is also means normally blocking communication from the start bottle and the tank to the pump inlet. Upon aircraft engine failure, the start valve is opened and the communication between the cell and the pump inlet is opened so that fuel from the start cell goes through the pump and through a pump outlet conduit to the decomposition chamber. At the same time, low gas pressure is placed upon the fuel in the tank. As the pump speed rises, the pump draws fuel from the tank and forces the fuel into the decomposition chamber, whereupon the start sequence is completed.

12 Claims, 2 Drawing Figures

EMERGENCY HYDRAULIC POWER SYSTEM (START BOTTLE)

BACKGROUND OF THE INVENTION

Modern aircraft includes a hydraulic power system for delivering fluid under pressure to operate such components as rudder, slats, flaps and ailerons. The pump for the hydraulic system is driven from the aircraft engine; so it is essential that there be an auxiliary power system which permits safe operation and landing of the aircraft in the event of engine failure. Such systems are disclosed in U.S. Pat. Nos. 3,660,977, 3,722,217, and 3,800,534, all owned by applicant's assignee. The systems disclosed in those three patents all use a start grain to provide energy to the turbine until turbine speed is high enough to cause the fuel pump to deliver fuel under pressure from the main fuel tank to the decomposition chamber.

Use of a start grain for initiating operation of the system involves an inherent difficulty which derives from the fact that the rate of energy release from the grain may not match the requirements of the system over a wide range of temperatures encountered in use. The rapid burning and rapid energy delivery from a warm grain could result in turbine overspeed which can be damaging to the system. While this need has been met by secondary speed controls in accordance with U.S. Pat. No. 3,800,534, it is still desirable to have a start system which does not require the use of a start grain.

In the event the tank must be located a considerable distance from the fuel pump, it may be desirable to provide a boost pump at the tank outlet to minimize the required tank pressurization and line sizes.

SUMMARY OF THE INVENTION

The principal object of the invention is to provide means for starting an emergency hydraulic power system for aircraft which does not require the use of a start grain.

Another object of the invention is to provide an emergency hydraulic power system which does not require high pressure in the fuel tank.

Still another object of the invention is to provide an emergency hydraulic power system in which high pressure gas from a cylinder expels starting fuel from a cell in a small storage bottle and drives the starting fuel to the decomposition chamber; while at the same time a branch line which is provided with a regulating valve set for quite low pressure permits gas from the high pressure cylinder to exert a relatively low pressure upon the fuel in the tank.

Yet another object of the invention is to provide an emergency hydraulic power system in which an inlet conduit which connects the fuel tank with the fuel pump inlet is provided with a normally closed solenoid valve, and a jet conduit which connects the pump outlet conduit with a normally closed solenoid valve. When the turbine reaches a predetermined speed following startup, speed sensing means acts through an electronic controller to open both of the aforesaid normally closed solenoid valves so that part of the start fuel supplied by the fuel pump goes to the jet pump which assists in delivery of fuel from the fuel tank to the decomposition chamber.

THE DRAWINGS

FIG. 1 is a diagrammatic illustration of a first embodiment of an emergency hydraulic power system embodying the present invention; and FIG. 2 is a diagrammatic illustration of a second embodiment of such a power supply system.

DETAILED DESCRIPTION OF THE INVENTION

I. First Embodiment

Figure 1:
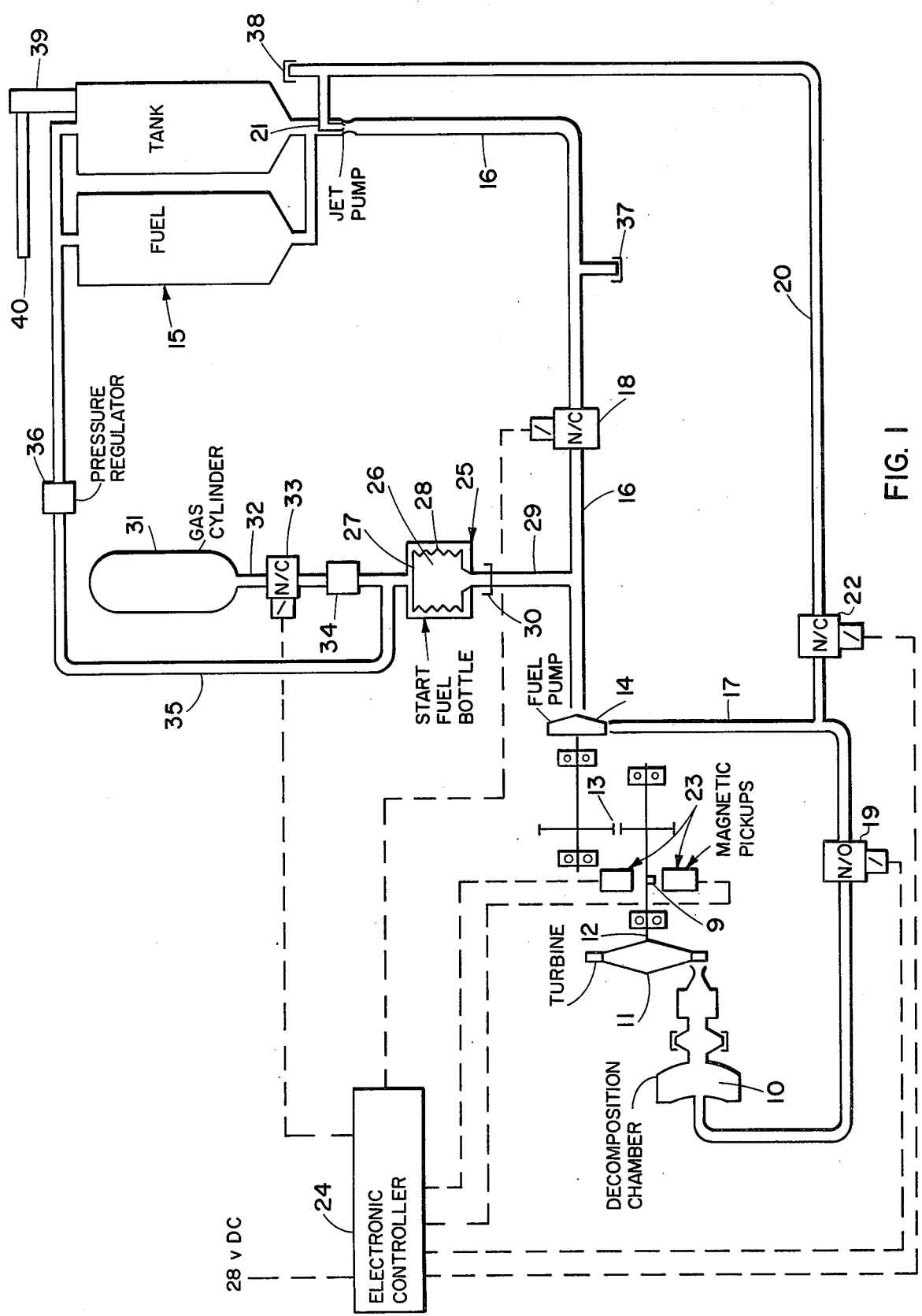

Referring to FIG. 1, an emergency hydraulic power supply system includes a decomposition chamber 10 such as a thermal or a catalytic decomposition chamber which produces hot gases to drive a turbine 11 having output shaft 12 driving a gear box, indicated generally at 13. A fuel pump 14 is driven by the turbine 11 through the gear box to supply monopropellant fuel to the decomposition chamber from a fuel tank 15 which may be located remotely from the turbine. One fuel tank of this general type is disclosed in U.S. Pat. No. 3,903,924 which is assigned to the assignee of the present application.

An inlet conduit 16 connects the fuel tank 15 to the inlet side of the fuel pump 14, and an outlet conduit 17 connects the outlet side of the fuel pump with the decomposition chamber 10. A normally closed solenoid run/overspeed valve 18 is in the inlet conduit 16, and a normally open solenoid primary speed valve 19 is in the outlet conduit 17. A jet conduit 20 connect the outlet conduit 17 with a jet pump 21 which is operatively associated with the fuel tank 15 and the inlet conduit 16. A normally closed solenoid run valve 22 controls flow through the jet conduit 20.

Conventional magnetic pickups 23 provide means for sensing the speed of the turbine 11 by detecting the passing of a projection 9 attached to the output shaft 12 as the latter is rotated. The pickups provide input to a system controller such as the electronic controller 24 which controls operation of the normally closed valves 18 and 22 and the normally open valve 19.

In normal aircraft operation, the gear box 13 is driven by any suitable means from a main aircraft engine (not shown) and a hydraulic pump (not shown) is mechanically driven off the gear box 13 to supply the power for the aircraft hydraulic system. In case of failure of the main aircraft engine, the emergency hydraulic power system is started, and it is the means for starting and operating this emergency system until the fuel pump 14 starts to draw fuel from the tank 15 that is the subject of the present invention.

A start fuel bottle, indicated generally at 25, includes a cell 26 which is filled with the same fuel as that in the tank 15, and the cell 26 has a movable wall 27 and a collapsible sidewall 28. A start fuel conduit 29 connects the cell 26 with the inlet conduit 16 downstream from the normally closed valve 18; and a burst disc 30 provides means normally blocking communication between the cell 26 and the inlet to the fuel pump 14.

A cylinder 31 contains gas at a pressure of, for example, 3,000 psig; and a first gas conduit 32 connects the cylinder 31 with the start bottle 25 through a normally closed start valve 33 and a pressure regulator 34 which is set for a relatively high pressure such as 800 psig. Connected to the first conduit 32 between the pressure regulator 34 and the start fuel bottle 25 is a branch conduit 35 which is connected with the fuel tank 15 through a pressure regulator 36 which is set to a relatively low pressure such as 35 to 39 psig.

In the event of main aircraft engine failure, a command signal produced automatically by the electronic controller 24 causes the start valve 33 to be opened. Alternatively, the command signal may be produced by manually throwing a switch (not shown). Once the start valve is opened, gas from the cylinder 31 flows through both the branch conduit 35, to pressurize the fuel tank, and the conduit 32, leading to the start bottle 25. Because of the pressure regulator 36, the fuel tank is pressurized at the low pressure of 35 to 39 psig. On the other hand, the gas flowing into the conduit 32 and the regulator 34 applies a pressure of about 800 psig to the movable wall 27 of the cell 26, causing the burst disc 30 to rupture and forcing fuel from the cell to the decomposition chamber 10. In the exemplary embodiment, the fuel pump 14 is a dynamic pump so that the fuel from the cell flows into the start fuel conduit 29 to the downstream end portion of the inlet conduit 16 and then through the fuel pump 14 to the outlet conduit 17. Should it be desirable to use a different type of fuel pump, such as a gear pump, which would not allow the through flow of fuel during startup, a suitable bypass and check valve arrangement (not shown) may be employed to connect the start fuel conduit 29 directly to the outlet conduit 17 upstream of the normally open solenoid primary speed valve 19.

The hot gasses produced by the decomposition chamber 10 drive the turbine 11 to start up the fuel pump 14 through the gear box 13 and also to drive the hydraulic pump (not shown) for the aircraft emergency hydraulic system. When turbine speed has reached a predetermined level, such as 90% of normal operating speed, as sensed by the magnetic pickups 23, the electronic controller 24 functions to open the normally closed valves 18 and 22. Then, there is an immediate rush of fuel from the outlet conduit 17 through the jet conduit 20 to the jet pump 21 which cooperates with the fuel pump 14 in supplying fuel from the tank 15.

In operation, the supply of fuel to the decomposition chamber 10 is controlled by the primary speed valve 19 and the run/overspeed valve 18 as taught in the prior art.

As indicated in the drawing, the system includes a fuel fill port 37 and an air vent 38 for refilling the system; and the fuel tank is provided with a relief valve 39 and vent pipe 40 in the usual way.

II. The Second Embodiment

Figure 2:
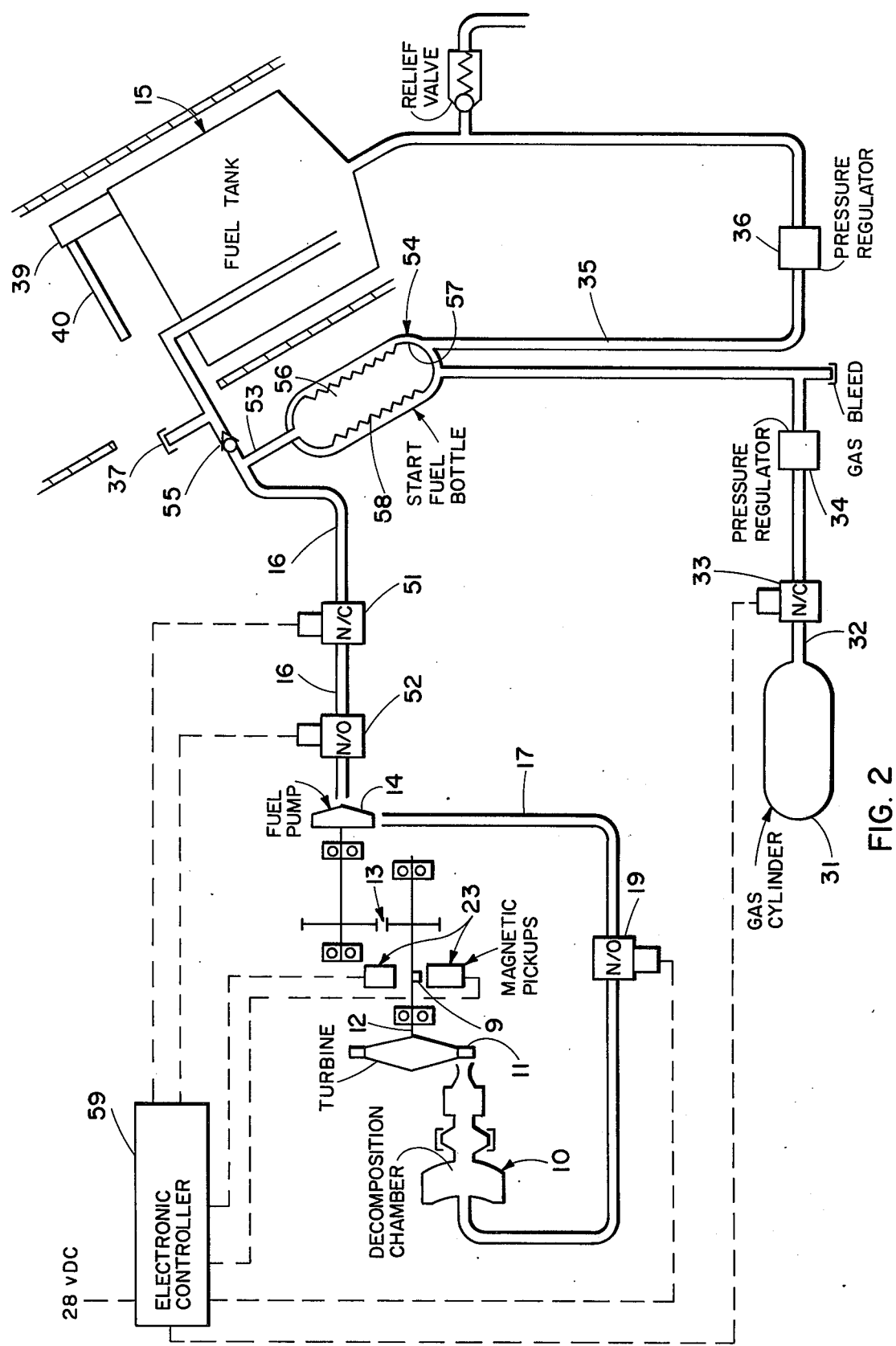

Referring now to FIG. 2, the second embodiment is similar to the first and to the prior art in including a decomposition chamber 10, a turbine 11, a turbine output shaft 12 with projection 9, a gear box 13, a fuel pump 14, and a fuel tank 15. There is also an inlet conduit 16 between the fuel tank 15 and the fuel pump 14, and an outlet conduit 17 between the fuel pump 14 and the decomposition chamber 10. There is also a solenoid primary speed control valve 19 in the outlet conduit 17 as there is in the first embodiment of the invention.

The second embodiment differs from the first embodiment principally in eliminating the jet pump 21 and the jet pump conduit 20; and substituting for the solenoid run/overspeed valve 18 and the solenoid run valve 22 a normally closed solenoid run valve 51 and an overspeed control valve 52, both of which are in the inlet conduit 16 downstream from a start fuel conduit 53. With the solenoid run valve 51 downstream from the start fuel conduit 53 the burst disc 30 of the first embodiment may be eliminated; and in order to prevent start fuel from passing from a start fuel bottle, indicated generally at 54, to the fuel tank 15, a check valve 55 is located in the infeed conduit 16 between the start fuel conduit 53 and the fuel tank.

As in the first embodiment of the invention, the start fuel bottle 54 contains a cell 56 that has a movable wall 57 and a collapsible wall 58; and the cell 56 is filled with the same fuel that is in the fuel tank 15.

A gas cylinder 31 is connected through a conduit 32 to the start bottle, and in the conduit 32 are a start valve 33 and a pressure regulator 34. A branch conduit 35 is in communication with the conduit 32 through the rear of the start bottle 54, there is a pressure regulator 36 in the branch conduit 35. Pressure of gas in the cylinder 31, and the pressures to which gas is regulated by the regulators 34 and 36, are the same as in the first embodiment.

Also as in the first embodiment, there are magnetic pickups 23 to sense turbine speed and feed the sensed information to an electronic controller 59. The electronic controller controls operation of the start valve 33, the primary speed control valve 19, the solenoid run valve 51 and the overspeed control valve 52.

Upon main aircraft engine failure, the start valve 33 is opened and at the same time the normally closed solenoid run valve 51 is opened. The pressure of gas from the cylinder 31 immediately expels start fuel from the cell 56 which passes through the start fuel conduit 53, the inlet conduit 16, the outlet conduit 17 and to the decomposition chamber 10 in order to begin operation of the turbine 11. At the same time, low gas pressure is applied to the fuel in the fuel tank 15; and as soon as turbine speed causes the operation of the fuel pump 14 to reach a high enough speed, fuel from the tank 15 passes through the check valve 55 with the assistance of the low pressure gas in the branch conduit 35.

The principal advantage of the second embodiment of the invention over the first embodiment is that recharging of the fuel tank 15 through a fuel fill port 37 also serves to recharge the start bottle cell 56 through the check valve 55 as soon as the fuel tank is full, whereas in the first embodiment it is necessary to replace the start fuel bottle 25 and burst disc 30, or else have separate means for recharging the start fuel bottle after the burst disc has been replaced.

The foregoing detailed description is given for clearness of understanding only and no unnecessary limitations should be understood therefrom, as modifications will be obvious to those skilled in the art.

I claim:

1. In an emergency hydraulic power system operable upon aircraft engine failure, said emergency system being of the type which includes a decomposition chamber, a rotary turbine driven by gaseous decomposition products from the chamber, a monofuel tank, a pump driven by the turbine and having an inlet and an outlet, inlet conduit means connecting the tank to the pump inlet, an outlet conduit connecting the pump outlet to the decomposition chamber, and a system controller, the improvement comprising, in combination:

a start bottle which includes a cell containing monofuel, said cell having;

start fuel conduit means connecting said cell to the decomposition chamber, means normally blocking communication between the cell and the decomposition chamber;

a cylinder of gas under pressure;

a first conduit connecting said cylinder to said bottle so that gas from the cylinder may cause said monofuel to be expelled from the cell;

a valve regulating pressure in said first conduit at a relatively high level;

a second conduit connecting said cylinder to the monofuel tank;

a valve regulating pressure in said second conduit at a low level;

a normally closed start valve blocking gas flow from said cylinder through said first conduit between the cylinder and the bottle;

means for opening said start valve;

means for opening said normally blocking means immediately following a command signal from the system controller;

and valve means normally preventing flow of fuel from the cell into the monofuel tank.

2. The combination of claim 1 in which said cell includes a movable wall, said normally blocking means comprising a burst disc between the cell and the start fuel conduit which is opened by the pressure applied to the movable cell wall by the gas under pressure.

3. The combination of claim 1 in which the normally blocking means comprises a normally closed solenoid valve in the inlet conduit, and in which the system controller opens both the start valve and said normally closed solenoid valve upon aircraft engine failure.

4. The combination of claim 1 in which the valve means normally preventing the flow of fuel from the cell into the monofuel tank comprises a check valve in the inlet conduit between the tank and the start fuel conduit.

5. The combination of claim 1 in which the valve means normally preventing the flow of fuel from the cell into the monofuel tank comprises a normally closed solenoid valve between the tank and the start fuel conduit, and which includes means for sensing turbine speed, and means in the controller operatively connected to said sensing means for opening said normally closed solenoid valve when turbine speed reaches a predetermined level.

6. The combination of claim 5 in which said start fuel conduit is connected to said decomposition chamber by connection to said inlet conduit means.

7. The combination of claim 6 which includes a jet pump operatively associated with the tank and the inlet conduit, a jet conduit connecting the jet pump to the outlet conduit, and a second normally closed solenoid valve in the inlet conduit which is opened when turbine speed reaches said predetermined level.

8. In an emergency hydraulic power system operable upon aircraft engine failure, said emergency system being of the type which includes a decomposition chamber, a power unit driven by gaseous decomposition products from the chamber, a monofuel tank, a pump driven by the power unit and having an inlet and an outlet, inlet conduit means connecting the tank to the pump inlet, an outlet conduit connecting the pump outlet to the decomposition chamber, and a system controller, the improvement comprising, in combination:

a start bottle which includes a cell containing monofuel, said cell having a movable wall;

conduit means connecting said cell with said outlet conduit;

a gas pressure source;

means including an openable valve to deliver gas from said source to the cell movable wall to apply pressure to the monofuel therein;

and means associated with said conduit means for normally blocking flow from said cell to said outlet conduit but openable upon starting of the system to permit flow of monofuel under pressure past the fuel pump, into the outlet conduit and to said decomposition chamber.

9. A combination as defined in claim 8 including conduit means downstream of said openable valve for delivering gas to said monofuel tank when gas is applied to the cell movable wall.

10. The combination of claim 9 which includes a jet pump operatively associated with the tank and the inlet conduit and a jet conduit connecting the jet pump to the outlet conduit.

11. The combination of claim 8 in which the means normally blocking flow comprises a burst disc which is opened by the pressure applied to the movable cell wall by the gas under pressure.

12. The combination of claim 8 in which the means normally blocking flow comprises a normally closed valve in the inlet conduit, and in which the system controller opens said normally closed valve upon start of the system.

* * * * *